INVENTORS
MARTIN DWYER
BY PHILIP B. EDWARDS
Kenyon & Kenyon
ATTORNEYS

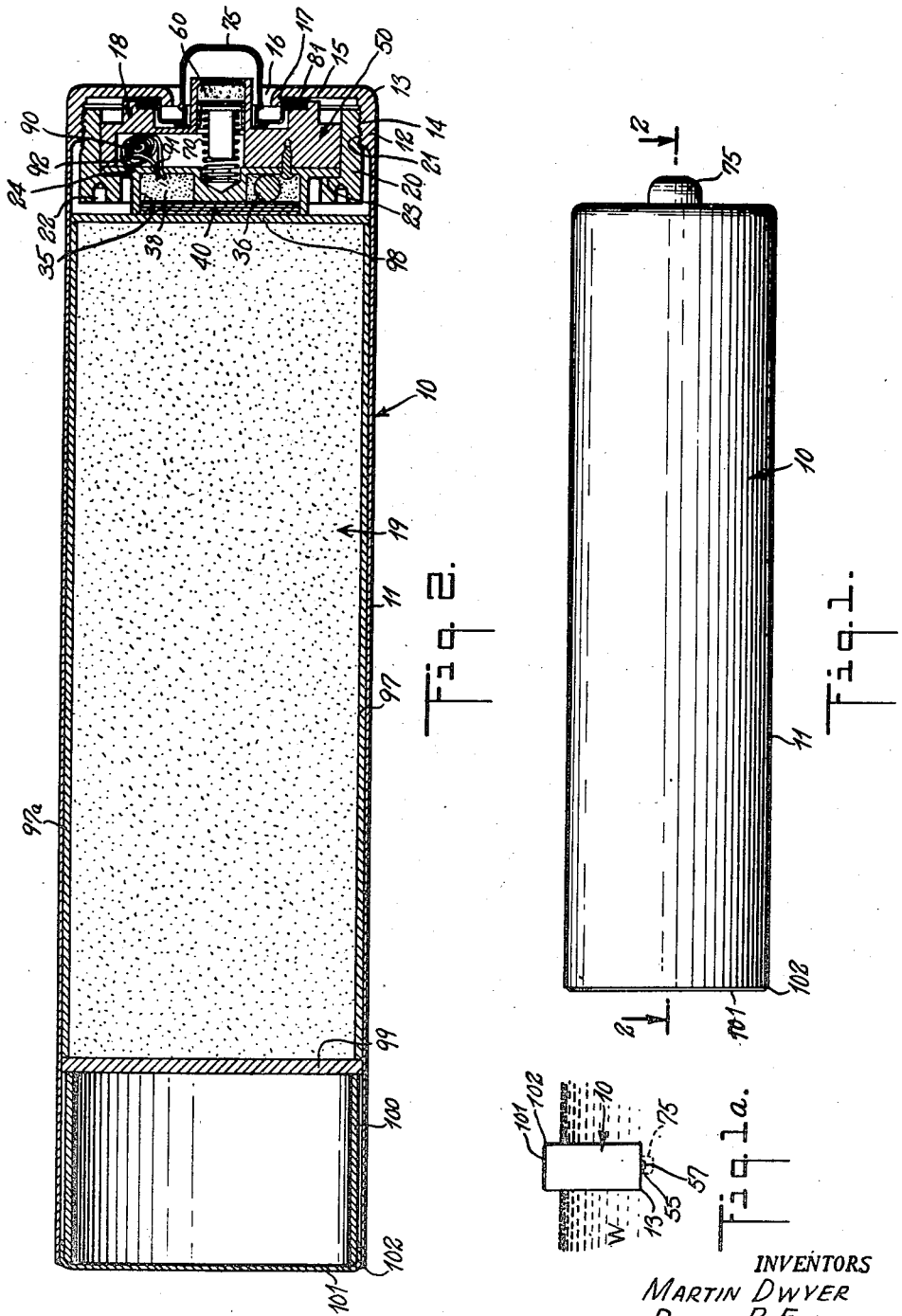

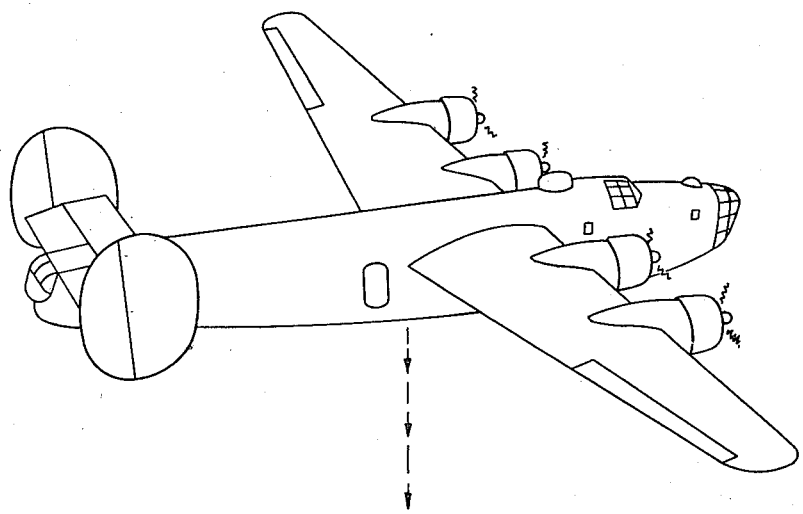
ALL SIGNALS
DISCHARGED AT
SUBSTANTIALLY
SAME TIME
 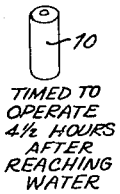 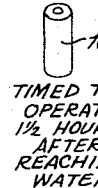 
TIMED TO OPERATE 6 HOURS AFTER REACHING WATER   TIMED TO OPERATE 4½ HOURS AFTER REACHING WATER   TIMED TO OPERATE 1½ HOURS AFTER REACHING WATER   TIMED TO OPERATE IN 30 SECONDS AFTER REACHING WATER
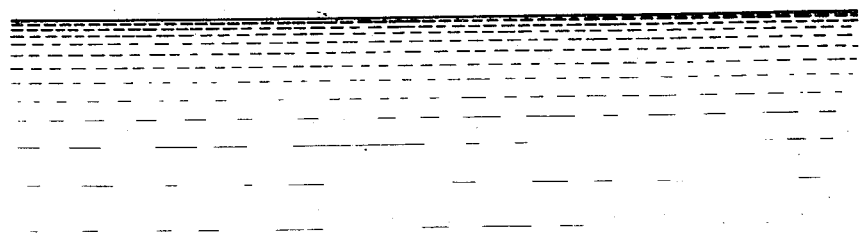
Fig. 5.
INVENTORS.
MARTIN DWYER
BY PHILIP B. EDWARDS
Kenyon & Kenyon
ATTORNEYS Patented Jan. 18, 1949

2,459,267

UNITED STATES PATENT OFFICE 2,459,267

SELF-CONTAINED EMERGENCY SIGNALING DEVICE ADAPTED TO BE OPERATED AUTOMATICALLY AFTER BEING LAUNCHED

Martin Dwyer, Hewlett Harbor, and Philip B. Edwards, Port Washington, N. Y., assignors to Aerial Products, Inc., Merrick, N. Y., a corporation of Delaware Application July 16, 1947, Serial No. 761,310

10 Claims. (Cl. 177—329)

This invention relates to emergency signalling devices and more particularly to signalling devices of this character that are self-contained and adapted for daytime signalling in emergencies and as an aid in the location of ditched aircraft, ditched cargo from aircraft or vessels or the wreckage of vessels or aircraft, particularly in bodies of water.

The location of the ditched cargo, wreckage, survivors of wreckage and other objects at sea or on large bodies of water is difficult particularly during the daytime because of the comparatively small size of the objects being sought, and also because of water-glare, haze and other well-known factors that interfere with the sighting of such objects.

An object of this invention is to provide a signalling device useful particularly for daytime signalling purposes that will provide a visual signal in the form of marked coloration of the water in the immediate vicinity or at the location of the objects or things that are to be found by searchers.

Another object of the invention is to provide a signal device of this character that is entirely self-contained, that is capable of storage for comparatively long periods of time without deterioration, that is available for instant use when a necessity for such use arises and that will automatically go into operation to discharge a water-soluble dye shortly after being thrown into a body of water after operating parts have been rendered accessible to water either by the discharge of the device from mechanical equipment, or by hand.

Another object of the invention is the provision of a signalling device of the character outlined that will require contact with water of operating parts which prior to use are inaccessible to water to initiate the automatic discharge after the said parts are rendered accessible to water of a signal such as a water-soluble dye of distinct coloration which upon discharge will distinctively color the water in its immediate vicinity and thereby facilitate the location of the desired scene by searchers.

Another object of the invention is to provide a device of this character in which the water-soluble dye is in powder form so that when the latter is expelled from the device in water, the powdered dye will be dispersed in a most efficient manner over a large surface area of water so that substantially all the dye expelled will be useful for coloration of the large surface area, and so that there will be substantially no loss of effective coloring resulting from any dye sinking below the water surface upon which it has been dispersed.

Another object of this invention is to provide a device of this character that can be readily manufactured at comparatively low cost; that is quickly assembled for shipment to needed locations, and that is capable of being quantitatively and rapidly produced.

Still another object of the invention is to provide a device of this character that will be hermetically sealed against any detrimental action of any storage environment prior to use and that will have a long storage life.

Another object of the invention is to provide devices of this character that may have different times of expulsion of water-soluble dye therefrom after operating parts thereof have been rendered accessible to water, so that a series of such differently timed devices thrown into a body of water as a group simultaneously either by hand or by mechanical equipment will provide automatic expulsion at differently timed intervals of the water soluble dyes therefrom, thus insuring visible coloration of the sea or other body of water in the vicinity of the desired scene over a longer period of time than if only one device were used.

Still another object of this invention is to provide novel methods of signalling with such differently timed signalling devices.

To the accomplishment of the foregoing and such other objects as may hereinafter appear, this invention consists in the novel methods, construction and arrangement of parts hereinafter described in detail and then sought to be defined in the appended claims, reference being had to the accompanying drawings which form a part hereof and which show merely for the purposes of illustrative disclosure, a preferred embodiment of the invention, it being expressly understood, however, that various changes may be made in practice within the scope of the claims without digressing from the inventive idea.

In the drawings in which similar reference characters denote corresponding parts:

Fig. 1 is an elevational view of a signalling device embodying the invention as it is intended to be stored in necessary places prior to its use;

Fig. 1a illustrates diagrammatically the position of a device embodying the invention after it has been thrown into a body of water and prior to the discharge of the water-soluble dye therefrom, and after a time delaying part thereof has been rendered accessible to water action.

Fig. 2 is a longitudinal section view on a larger scale taken along line 2—2 of Fig. 1 and viewed in the direction of the arrows;

Fig. 5 is a diagrammatic illustration of a method of signalling embodying the invention.

Figure 3:
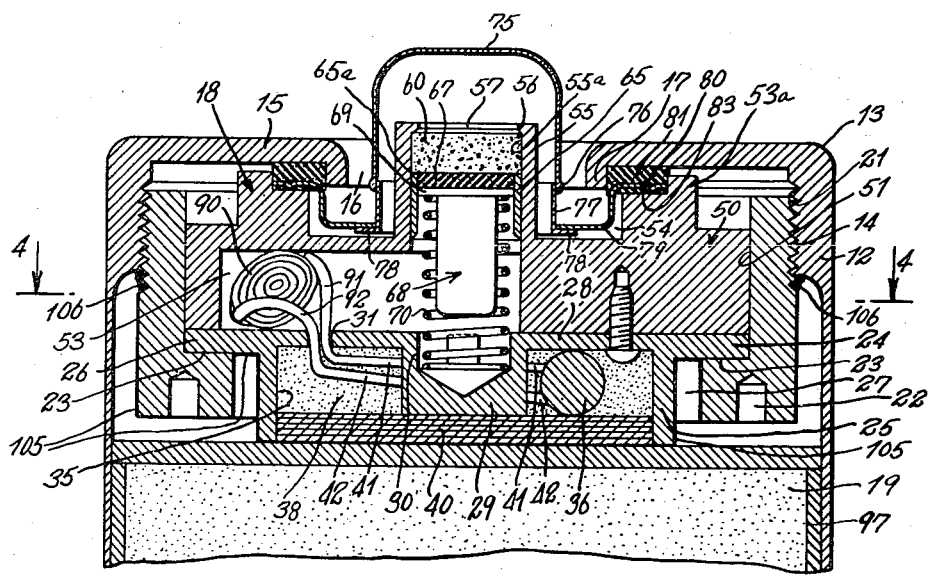
Fig. 3 is an enlarged sectional view taken along line 3—3 of Fig. 4 and illustrating structural features of the automatic firing mechanism for discharging the dye from the signalling device.
Figure 4:
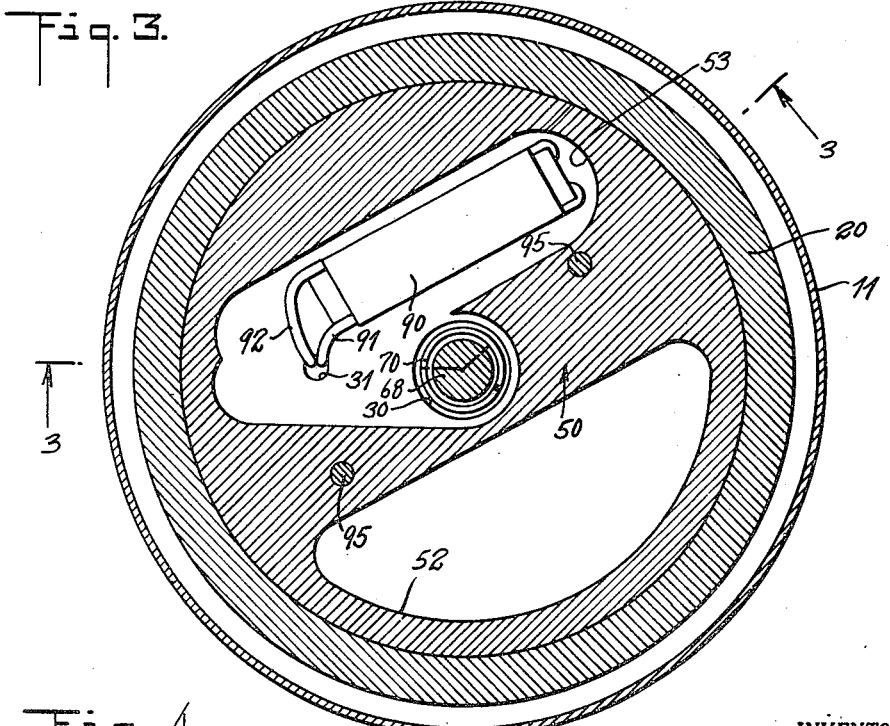
Fig. 4 is a transverse sectional view taken along line 4—4 of Fig. 3 illustrating further details.

Referring to the drawings, 10 denotes generally the signalling device as it appears ready for storage aboard ship, lifeboat, raft, aircraft or in other places for use when the occasion therefor arises. This signalling device 10 comprises a tubular container 11 of metal or other suitable material and preferably of aluminum or other light-weight metal that is resistant to corrosion over long periods of time. The wall of the container 11 is thickened at 12 adjacent one end 13 thereof and is internally threaded at 14. A cover 15, preferably integral with the end 13, is provided for the container. This cover 15 has an opening 16, and an inwardly depending lip 17 is provided on the cover 15 about the opening 16.

Automatic firing and dye expelling mechanism denoted generally by the reference character 18 is positioned in the container 11 adjacent the end 13 thereof. The dye charge to be expelled at the site of use is denoted generally by the reference character 19. This charge 19 is supported in the container adjacent the firing and expelling mechanism 18.

The firing and expelling mechanism 18 includes a supporting body or member 20. This member 20 is preferably of the same material as the container 11. In the embodiment shown, this member 20 is substantially tubular in shape and is externally threaded at 21. The threaded portion 21 is admeasured in diameter to permit the body 20 to be screwed into the threaded portion 14 of the container 11 after the assembly with the body 20 of other parts as will hereinafter appear. Holes 22 in the member 20 serve to permit the insertion of an appropriate tightening tool (not shown) during such assembly of the member 20 with the container 11. An annular shoulder 23 is provided on the member 20 on its internal face to receive an expelling charge container or holder 24.

The expelling charge container or holder 24 is carried on the shoulder 23 of the member 20. This holder 24 is preferably of the same material as the container 11. In the embodiment shown, the holder 24 is substantially tubular in a portion 25 thereof. A flange 26 serves to suspend the holder from the shoulder 23. The tubular portion 25 is admeasured in diameter to pass through the opening 27 of the member 20 below the shoulder 23 of the latter. A top wall 28 is provided for the holder 24 to close the uppermost end of the tubular portion 25. A boss 29 preferably integral with the wall 28 extends downwardly into the tubular portion 25. The boss 29 is countersunk at 30 for purposes presently to be described. The top cover or wall 28 also is provided with an opening 31 for purposes presently to be described. The recess 35 in the tubular portion 25 is adapted to receive an electrically operated exploder or squib 36 and an expelling charge 38. The squib 36 is of any type commercially available that may be fired by electricity. One such squib is manufactured by E. I. du Pont de Nemours & Co., and is designated by it as electric squib type S-36. This squib 36 is surrounded by or embedded in the expulsion charge 38. The expulsion charge 38, for example, may consist of black powder of desired quantity and grade. Black powder is a common explosive consisting of 62-75% potassium nitrate, 10-19% sulphur and 12-5% charcoal. Other explosives may be used. Retaining disks or washers 40 of chipboard, corrugated paper, cardboard or other suitable material are provided to support the expulsion charge 38 and the squib 36 within the recess 35. The two lead wires 41, 42 of the squib 36 pass through the opening 31 to the upper face of the cover 28 for purposes presently to be described.

A substantially cylindrical supporting block or member 50 is provided. This block 50 also preferably of the same material as the container 11 has a cylindrical portion 51 admeasured to fit within the tubular supporting member 20 and to rest upon the upper surface of the cover 28 to which it is secured in assembly as will be presently described. A pair of recesses 52, 53 are provided in the block 50 extending inwardly from the face of its cylindrical portion 51 which abuts the cover 28. Recess 52 is for weight reduction. Recess 53 is used for purposes to be described. The block 50 has a cylindrical portion 53a of reduced diameter and a recess or cavity 54 is provided in this portion 53a. A tubular portion 55 for purposes presently to be described and preferably integral with the block 50 extends upwardly from the bottom of the cavity 54. The bore 55a of the tubular portion is aligned with the bore 30. The tubular portion 55 is admeasured in length to extend outwardly through the opening 16 in the end 13 of the container for purposes presently to be described.

An annular lip 56 is provided on the tubular portion 55 adjacent to its outer end to provide a reduced opening 57. A time-delaying compound 60 is positioned within the tubular portion 55 directly adjacent the annular lip 56. Possible time-delay compounds are polyvinyl alcohol, water-soluble waxes, and metallic compounds or combinations that will be activated by water. Many others may be used. A specific time-delaying compound that has been found very effective is an iron magnesium composition. This time-delaying compound is a chemical mixture and comprises a mixture of finely-divided magnesium powder and finely-divided iron powder in the proportions of 12 grams of dry magnesium powder to 18 grams of dry iron powder. The constituents of this compound are intimately mixed, and loaded into the tubular portion 55 under a pressure of approximately 10 tons per square inch. The pressure has the effect of substantially solidifying the compound into a pellet form. The chemical mixture 60 is disintegrable upon contact with sea or other water. The weight or quantity of the compound 60 which is inserted into the tubular portion 55 determines the time necessary for disintegration and thus the delaying action that the compound 60 will provide as will presently be described. Any other type of time delay compound can be used.

A tubular liner or insert 65 preferably of the same material as container 11 is positioned within the tubular portion 55 directly adjacent the pellet 60 of the time-delaying compound. The edge 65a of this tubular insert 65 preferably is in contact with the inner face of the pellet 60.

A gasket 67 of synthetic or natural rubber or other appropriate gasket material is positioned within the tubular insert 65 directly in contact with the pellet 60. A gasket follower or plunger 68 of metal or other material having a headed portion 69 is provided. The headed portion 69 is in contact with the gasket 67 while the body portion 68 of smaller diameter extends into the recess 53 of the block 50. A compression spring 70 at one end engages the headed portion 69 of the follower 68 and at its other end is adapted to lie within the counterbore 30 provided in the cover 28 of the supporting body or member 20. When the parts are assembled as will presently be described, the spring 70 is under compression tending to push the pellet 60 outwardly through the opening 57. Since the pellet 60 is substantially solidified, the annular lip 56 or intimate contact between tubular portion 55 and pellet 60 (resulting from the pelleting pressure) or both prevent this as long as no water or chemical action is available to dissolve or disintegrate the pellet 60.

The chemical action necessary to dissolve the pellet 60 is that provided by sea or other water coming into contact with the pellet. Prior to the use of the device, the access of sea water to the pellet 60 is prevented by a protective arrangement or means now to be described.

In the embodiment shown, the protective arrangement includes a frangible dome 75. This dome preferably is of glass or other easily shatterable material. The dome 75 is joined by a glass-metal hermetic seal 76 to a tubular metallic supporting body 77. The tubular body 77 is secured at 78 as by a soldered or welded joint to a cup-like metallic member 79. This cup-like member 79 has a peripheral flange 80. The flange 80 is embedded in a gasket 81. The gasket 81 is of synthetic or natural rubber or other gasket material and it with the flange 80 are positioned to overlie a shoulder 83 provided in the portion 53a of the block 50 so that pressure will provide an effective seal between the contacting surfaces of the container top 15, the annular lip 17 about the opening 16 and the shoulder 83. When this seal is effected, the dome 75 covers the opening 57 and effectively prevents the access of sea water or other moisture to the pellet 60 as well as the access of any water to any of the contents of the container 11.

A water activated battery or battery cell 90 is carried within the cavity 53. This cell is of a commercially available type. One such cell is manufactured by the Burgess Battery Company and in one embodiment is designated by them as Burgess water-activated voltage cell type 1CC3B. Such a battery contains the necessary chemicals to produce an electric current but will not generate or deliver such electric current until water has access to or comes into contact with the battery as a whole and wets its chemical constituents. It is to be understood that available water-activated voltage cells manufactured by others besides the Burgess Battery Company are equally useful. The terminals of the lead wires 91, 92 of the water-activated cell 90 are connected electrically to the lead wires 41, 42, which are connected with the squib 36. As long as the water-activated cell 90 is kept dry within the recess 53, no electric current is generated and the squib 36 despite its direct electrical connection with the cell 90 is unaffected. The seals, provided first by the dome 75 and its supporting structure and secondly by the delaying pellet 60, prevent access of water to the cell 90 first until the dome 75 has been shattered and secondly until the time-delaying pellet 60 has been dissolved and expelled from the tubular member 55. The block 50 and the supporting member 24 in assembly are secured together, for example, by the drive bolts 95. This retains cell 90 in cavity 53, and also compresses the spring 70.

The dye charge 19 in the embodiment shown comprises a tubular charge of loosely powdered dye compound. This compound may be any dye soluble in water that has the effect of imparting a readily visible color to the water when dissolved. A suitable dye is uranine, a yellow dye whose chemical formula is $Na_2C_{20}H_{10}O_5$. This dye is also known as uranine yellow or fluorescein-sodium. Other water-soluble dyes may be used. In inserting the charge 19, the container 11 bearing the parts heretofore described is turned so that the dome 75 is at the bottom. Two semi-tubular sections 97, 97a of boxboard, cardboard or the like are inserted into the container to rest upon a metallic expelling disk 98 which is first inserted to lie in abutment with the retaining disks or washers 40. The two semi-tubular sections aid in efficient expulsion of the powdered dye as will be described. This powdered dye charge 19 is poured into the container 11 to lie between the sections 97, 97a and directly on the metallic expelling disk 98 which lies in abutment with the retaining disks or washers 40. The dye charge 19 and semi-tubular sections 97, 97a are short of the full length of the container 11 and their outermost ends are covered by a disk 99 of chipboard, cardboard or the like. A tubular spacer 100 of material similar to disk 99 is positioned between the disk 99 and the metallic container cover 101. The container cover 101 is of the same material as container 11 and is hermetically sealed thereto at 102, for example, by soldering. If desired, as an alternative, the dye charge 19 instead of being in powder form may be a cylindrical block that will disintegrate and dissolve quickly in water after expulsion. It is preferable, however, that the water-soluble dye be in loosely powdered form. During assembly and prior to insertion of the dye charge 19 and associated parts, suitable sealing compound such as rubber cement 105 or the like may be applied to contacting surfaces of metal parts (see Fig. 3) that are assembled adjacent the end 13 of the container 11 to seal joints against leakage and as protective coatings. Sealing wax 106 also may be applied.

The entire contents of the container 11 in the assembled condition shown in Fig. 2 are thus effectively sealed against the action of water or climatic conditions and may be stored for indefinite periods of time without deterioration until the necessity for the use of the device arises. When the necessity for use arises, the frangible dome 75 is broken either by discharge of the device from an automatic discharging device or by hand. Thereafter, as soon as the device falls or is thrown into the water, it floats with the end 101 uppermost and the end 13 at the bottom and submerged in the water as shown in Fig. 1a. Sea water or other water in which the device is floating is now able to reach the pellet 60 through the now exposed opening 57. The action of the sea water or other water causes the pellet 60 to dissolve or disintegrate. The size of the pellet 60 and quantity and nature of its constituents determine the length of the time necessary for its effective dissolution or disintegration. When the dissolution or disintegration of the pellet 60 is substantially complete, or when very material disintegration of the pellet has occurred, the compression spring 70 is able to act to expel the gasket 67 with the gasket follower 68 from the tubular member 55 through the opening 57. This expulsion, because the gasket 67 and follower 68 act like a piston, leaves a partial vacuum behind in opening 57 and in chamber or recess 53. Water then rushes in through the opening 57 and passes into chamber or recess 53 and thus reaches the water-activated cell 90. In other words access of water to cell 90 is sudden. When this occurs and sufficient water is absorbed by the cell 90 it delivers an electric current which is sufficient to explode or ignite the squib 36. The explosion or ignition of the squib 36 in turn explodes the expelling charge 38. The explosion of the expelling charge 38 is sufficiently violent to drive plate 98 and with it the dye charge 19, the semi-tubular members 97, 97a, the disk 99 and spacer 100 out of the container 11 by rupturing the cover 101, which as seen in Fig. 1a then lies at or just above the surface of the water W. The semi-tubular members 97, 97a, fall away from the dye charge 19 after it has been completely expelled from the container through the ruptured cover 101 and is in the air above the surface of the water. In consequence the powdered charge 19 blown up into the air above the surface of the water is dispersed and settles on the water over a wide area. The settled powder dissolves upon contact with the water and this colors a fairly wide area of water in the vicinity of the container from which it has been expelled. Since the charge 19 is in powder form it dissolves quickly and little if any sinks below the water surface upon which it falls. Practically all the dye powder is thus effectively used for coloring the surface area of the water. The colored area of water then is visible to the searcher from comparatively great distances and facilitates location of the desired site.

Inasmuch as the length of time for dissolution or disintegration of the delaying pellet 60 can be regulated by its weight, size or by the nature of its constituents, it is possible to provide devices having different expulsion times after access of water to their resepective pellets 60. For example, devices may be made to delay expulsion of the powdered dye charge 19 for 30 seconds, others for one and one-half hours, others for four and one-half hours and others for six hours after access to water is made available to their pellets 60 simply by changing the weights of materials escribed which are embodied in the said time-delaying pellets 60.

If several devices as a group with successively heavier and thus longer time-delaying pellets 60 are simultaneously thrown into the water either by hand or by mechanical equipment, after the breaking of their frangible domes 75, the device of the group with the shortest time-delaying pellet 60 will expel its dye charge 19 first. Thereafter in succession at timed intervals controlled by the timing action of the particular pellet 60 of each of the other devices, each in turn will expel its dye charge 19. As a result colored areas of water in the vicinity of the original scene will be available for a longer period of time than if one device only were used. Should currents move the devices thrown into the water away from the original scene prior to its location by searchers, the series of colored areas of water provided by the successively timed expulsions of the respective dye charges 19 of the differently timed devices of the group will provide a trail in the form of colored water areas that will facilitate location of the original scene.

The devices described are useful for all kinds of signalling and marking purposes at sea, are entirely self-contained and may be stored for long periods of time without deterioration prior to use and are effective in operation for the intended purposes.

While the signal within the container is preferably the dye charge 19, it is to be understood that other types of signals could replace the dye charge 19 and be ejected in the same way as the dye charge 19.

While specific embodiments of the invention have been described, variations in structural detail are possible and are contemplated within the scope of the claims. There is no intention, therefore, of limitation to the exact details shown and described.

What is claimed is:

1. A signalling device of the character described comprising a container, a signal within said container, explosive means within said container to expel said signal from said container, electrically operated means to fire said explosive means, chemical means disintegrable on contact with water to prevent operation of said electrically operated means for a predetermined time after contact with water, and frangible means to prevent access of water to said chemical means until said frangible means is destroyed.

2. A signalling device of the character described comprising a container, a water-soluble dye within said container, an explosive expelling charge within said container to expel said dye therefrom, an electrically operated firing means for exploding said expelling charge, an electric cell of the water-activated type connected to said firing means and capable of generating an electric current to operate said firing means only when water becomes accessible to said cell, means disintegrable upon contact with water to delay access of water to said cell, and destructible protective means to prevent access of water to said disintegrable means prior to use of said device.

3. A signalling device of the character described comprising a container, a signal within said container, an explosive expelling charge within said container to expel said signal therefrom, an electrically operated exploder for said expelling charge, an electric cell of the water-activated type connected to said exploder and capable of generating an electric current to actuate said exploder only when water becomes accessible to said cell, chemical means disintegrable upon contact with water to delay access of water to said cell, spring-actuated means to facilitate access of water to said cell when disintegration of said chemical means is substantially complete, and destructible protective means to prevent access of water to said chemical means prior to the use of said device.

4. A signalling device of the character described comprising a container, a water-soluble dye within said container, explosive means including an expelling charge within said container to expel said dye from said container, a water-activated electric cell within said container for generating an electric current to fire said explosive means when water becomes accessible to said cell, and protective means to prevent access of water to said cell prior to use of said device, said protective means including disintegrating means requiring contact with water for disintegration and frangible member that must be destroyed before water is accessible to act upon said disintegrating means, said disintegrating means serving to delay access of water to said cell after said frangible member has been destroyed.

5. A signalling device of the character described comprising a container, a water-soluble signal within said container, supporting means within said container, an explosive charge to expel said signal carried by a part of said supporting means, an electrically operated firing means for exploding said expelling charge also carried by said part of said supporting means, an electric cell of the water-activated type connected to said firing means and capable of generating an electric current to operate said firing means only when water becomes accessible to said cell, said cell being carried in a recess in another part of said supporting means, chemical means disintegrable upon contact with water carried in a hollow part of said supporting means that communicates with the recess and arranged in said hollow part to delay access of water to said cell, a destructible sealing member to prevent access of water to said disintegrating means prior to the use of said device, and sealing means to prevent access of water to said signal until it has been expelled from said container.

6. A signalling device of the character described comprising a container, a water-soluble signal within said container, supporting means within said container, an explosive charge to expel said signal carried by a part of said supporting means, an electrically operated firing means for exploding said expelling charge also carried by said part of said supporting means, an electric cell of the water-activated type connected to said firing means and capable of generating an electric current to operate said firing means only when water becomes accessible to said cell, said cell being carried in a recess in another part of said supporting means, chemical means disintegrable upon contact with water carried in a hollow part of said supporting means that communicates with the recess and arranged in said hollow part to delay access of water to said cell, and a destructible sealing member to prevent access of water to said disintegrating means prior to the use of said device.

7. A signalling device of the character described comprising a container, a water-soluble dye in powder form within said container, an explosive expelling charge within said container to expel said dye therefrom, an electrically operated firing means for exploding said expelling charge, an electric cell of the water-activated type connected to said firing means and capable of generating an electric current to operate said firing means only when water becomes accessible to said cell, means disintegrable upon contact with water to delay access of water to said cell, and destructible protective means to prevent access of water to said disintegrable means prior to use of said device.

8. A signalling device of the character described comprising a container, a signal within said container, an explosive expelling charge within said container to expel said signal therefrom, an electrically operated exploder for said expelling charge, an electric cell of the water-activated type connected to said exploder and capable of generating an electric current to actuate said exploder only when water becomes accessible to said cell, chemical means disintegrable upon contact with water to delay access of water to said cell, spring-actuated means including parts adapted to act as a piston to facilitate sudden access of water to said cell when disintegration of said chemical means is substantially complete, and destructible protective means to prevent access of water to said chemical means prior to the use of said device.

9. A method of signalling with a group of signalling devices each adapted for actuation by contact with water and each having a time-delaying means disintegrable by action of water for preventing access of water to effect actuation of the device until disintegration has occurred, and with the times of disintegration of the time-delaying means of the devices of the group differing, comprising the steps of rendering the time-delaying means of the devices of said group accessible to water and depositing all the devices of said group in a body of water at substantially the same time so that the differing times of disintegration of the respective water accessible time-delaying means of the devices will permit water to actuate the signalling devices of the group at timed intervals after their deposit in the body of water determined by the disintegration times in water required by the respective time-delaying means of the devices.

10. A method of signalling with a group of signalling devices each comprising a signal, water actuated means for expelling the signal automatically, and time-delaying means disintegrable upon contact with water to delay access of water to said water-actuated expelling means, with the times of disintegration of the time-delaying means of each of said devices in said group differing, comprising the steps of rendering the time-delaying means of each of said devices of such group accessible to water and depositing the group of such signalling devices in a body of water at substantially the same time so that water becomes accessible to act upon the time-delaying means of each device at substantially the same time but the differing times of disintegration by water of the time-delaying means of each device permits access of water to the water-actuated expelling means of respective of the devices of the group at successively longer time intervals with consequent successively timed expulsions of the signals of the devices of said group.

MARTIN DWYER.
PHILIP B. EDWARDS.

REFERENCES CITED

The following references are of record in the file of this patent:

UNITED STATES PATENTS

| Number | Name | Date |
|---|---|---|
| 341,537 | Zalinski | May 11, 1886 |
| 1,295,213 | Saladiner | Feb. 25, 1919 |
| 1,381,371 | Wanklyn | June 14, 1921 |
| 1,570,733 | Eschbach | Jan. 26, 1926 |
| 2,192,450 | Miller | Mar. 5, 1940 |
| 2,418,392 | Bender | Apr. 1, 1947 |

FOREIGN PATENTS

| Number | Country | Date |
|---|---|---|
| 706,513 | France | Mar. 30, 1931 |